United States Patent [19]

Imura et al.

[11] Patent Number: 5,623,031
[45] Date of Patent: Apr. 22, 1997

[54] MODIFIED LIQUID EPOXY RESIN COMPOSITION

[75] Inventors: Tetsuro Imura; Yasuyuki Murata; Yoshinori Nakanishi, all of Yokkaichi, Japan

[73] Assignee: Shell Oil Company, Houston, Tex.

[21] Appl. No.: 585,380

[22] Filed: Jan. 11, 1996

Related U.S. Application Data

[63] Continuation of Ser. No. 288,371, Aug. 10, 1994, abandoned.

[30] Foreign Application Priority Data

Aug. 20, 1993 [JP] Japan ..................... 5-226714

[51] Int. Cl.$^6$ ..................... C08F 283/00; C08L 61/00
[52] U.S. Cl. ..................... 525/489; 525/481; 525/533; 525/531; 528/97; 528/100; 528/103; 528/104; 528/112
[58] Field of Search ..................... 528/87, 88, 97, 528/100, 103, 104, 112; 525/531, 533, 523, 481, 489

[56] References Cited

U.S. PATENT DOCUMENTS

| | | | |
|---|---|---|---|
| 3,247,136 | 4/1966 | Wynstra et al. | 260/18 |
| 3,256,226 | 6/1966 | Kekete et al. | 260/23.5 |
| 3,424,721 | 1/1969 | Kleinschmidt et al. | 260/47 |
| 4,026,862 | 5/1977 | Smith et al. | 260/37 |
| 4,394,497 | 7/1983 | Nelson et al. | 528/101 |
| 4,421,897 | 12/1983 | Gutekunst et al. | 525/113 |
| 4,783,509 | 11/1988 | Cavitt et al. | 525/527 |
| 4,808,692 | 2/1989 | Pham et al. | 525/480 |
| 4,855,385 | 8/1989 | Cavitt | 528/97 |
| 4,895,755 | 1/1990 | Berman et al. | 525/481 |
| 4,920,164 | 4/1990 | Sasaki et al. | 525/396 |
| 5,141,974 | 8/1992 | Konishi et al. | 523/466 |
| 5,149,730 | 9/1992 | Murata et al. | 523/466 |
| 5,206,313 | 4/1993 | Ono et al. | 525/524 |
| 5,266,405 | 11/1993 | Kirchmeyer et al. | 525/423 |
| 5,385,990 | 1/1995 | Abbey et al. | 525/534 |

FOREIGN PATENT DOCUMENTS

| | | |
|---|---|---|
| 0160622 | 5/1984 | European Pat. Off. |
| 1620394 | 1/1973 | Germany |
| 49-045993 | 5/1974 | Japan |
| 3-14816 | 3/1991 | Japan |
| 04211420-A | 8/1992 | Japan |
| 473143 | 7/1969 | Switzerland |

*Primary Examiner*—John C. Bleutge
*Assistant Examiner*—Randy Gulakowski

[57] ABSTRACT

A modified liquid epoxy resin composition is provided by reacting a crystalline epoxy resin, from about 3 to about 20 parts by weight, based on the epoxy resin, of a compound having two or more phenolic hydroxyl groups and/or carboxyl groups in one molecule and from about 3 to about 20 parts by weight of a compound having one phenolic hydroxyl group or carboxyl group in one molecule. The crystalline epoxy resin is preferably selected from various glycidylethers of biphenol compounds. The modified liquid epoxy resin composition has a low viscosity and good liquid stability at low temperatures, resulting in cured resins having excellent heat resistance and water resistance.

11 Claims, No Drawings

MODIFIED LIQUID EPOXY RESIN COMPOSITION

This is a continuation of application Ser. No. 08/288,371 filed Aug. 10, 1994 now abandoned.

FIELD OF THE INVENTION

This invention relates to an epoxy resin composition. In one aspect, the invention relates to a novel modified liquid epoxy resin composition which has a low viscosity and is a stable liquid at low temperatures.

BACKGROUND OF THE INVENTION

A liquid epoxy resin composition is widely used in various fields such as, for example, adhesives, casting materials, sealants, laminating material, molding materials and coating materials, because of its excellent cured property and easy handling.

Recently, resin materials have been required to have high-performance characteristics with the advance of related techniques and the variation of the environments where they are used. In particular, where resin materials are used as adhesives, casting materials, sealants, molding materials, laminating materials, improvement in the heat resistance and water resistance of the materials is important. However, conventional liquid epoxy resin compositions which have been commonly used up to the present do not sufficiently satisfy the necessary characteristics.

For instance, liquid epoxy resin compositions containing, as a base, a bisphenol A-type epoxy resin or bisphenol F-type epoxy resin, which are widely used at present, do not have sufficient heat resistance and water resistance.

In order to improve the heat resistance, multi-functional epoxy resins such as novolak-type epoxy resins, tri-functional epoxy resins, and tetra-functional epoxy resins were used. However, they are difficult to handle as liquids since such multi-functional epoxy resins have extremely high viscosities or are solids at room temperature.

Liquid epoxy resins having excellent heat resistance and having a low viscosity derived from amine compounds such as aminophenols, xylenediamines are known. However, cured resins of such amine-type epoxy resins have poor water resistance.

Epoxy resins with a rigid skeleton such as, for example, biphenol-type epoxy resins, bisphenol S-type epoxy resins, hydroquinone-type epoxy resins and the like, have excellent heat resistance and a low molecular weight are expected to have a low viscosity. However, because of their rigid skeletons, they often crystallize at room temperature. Therefore, it is difficult to handle them as liquids.

Japanese Patent Application Laid-Open No. 4-211420 discloses a method of reacting a liquid epoxy resin and an unsaturated carboxylic acid as a mean of preventing the crystallization of liquid epoxy resins. However, the method is not effective enough to liquify crystalline epoxy resins. In this method, when the degree of modification of the epoxy resin is raised (or the amount of the unsaturated carboxylic acid to be used for the modification is increased) to increase the crystallization preventing effect, then the number of the functional groups in the epoxy resin is decreased resulting in worse heat resistance and water resistance properites of the cured resin.

Japanese Patent Application Laid-Open No. 3-14816 discloses a method of inactivating the crystallizing property of biphenol-type epoxy resins, in which a biphenol-type epoxy resin is reacted with a polyphenol. However, since the object of the method was to increase the molecular weight of a biphenol-type epoxy resin to modify the resin into an amorphous solid with a low softening point and a high viscosity for the purpose of facilitating the transfer molding of the modified resin, this method does not porvide a liquid resin composition with a low viscosity.

It is therefore an object of the present invention to provide a novel modified liquid epoxy resin composition which has a low viscosity and is a stable liquid at low temperature. It is another object of the invention to provide a cured resin having excellent heat resistance and water resistance. It is another object of the present invention to provide a novel curable liquid epoxy resin composition comprising the modified liquid epoxy resin composition and an epoxy resin curing agent.

SUMMARY OF THE INVENTION

Accordingly, a liquid epoxy resin composition is provided comprising a crystalline epoxy resin and a compound having two or more phenolic hydroxyl groups and/or carboxyl groups in one molecule and a compound having one phenolic hydroxyl groups or carboxyl group in one molecule.

The invention aims at an application in liquid encapsulants, casting, adhesives and other fields which require heat resistance and water resistance.

DETAILED DESCRIPTION OF THE INVENTION

It has been found that by modifying the liquefying crystalline epoxy resins by certain means, a novel modified liquid epoxy resin composition which has a low viscosity and is stable liquid at low temperatures and which may yield a cured resin having excellent heat resistance and water resistance can be provided. A liquid epoxy resin composition is provided which has a low viscosity and is a stable liquid at low temperatures and which has lost its crystallizing property due to modification while maintaining excellent cured property of a crystalline epoxy resin to give a cured resin having good heat resistance and water resistance. The composition is especially useful for various uses as adhesives, casting materials, sealants, molding materials and laminating materials, which need heat resistance and water resistance.

The liquid epoxy resin is prepared by modification of crystalline epoxy resins, especially biphenol-type epoxy resin. Crystalline epoxy resins are modified by the reaction with a difunctional or multifunctional phenol and/or carboxylic acid and a monofunctional phenol or carboxylic acid.

Specifically, the present invention provides a modified liquid epoxy resin composition to be prepared by reacting (a) an epoxy resin comprising a crystalline epoxy resin, (b) from about 3 to about 20 parts by weight, based on the epoxy resin of a compound having two or more phenolic hydroxyl groups and/or carboxyl groups in one molecule and (c) from about 3 to about 20 parts by weight, based on the epoxy resin of a compound having one phenolic hydroxyl group or carboxyl group in one molecule.

The crystalline epoxy resin to be used in preparing the modified liquid epoxy resin composition of the present invention is an epoxy resin consisting essentially of a crystalline epoxy resin, that is, an epoxy resin which has a melting point of not lower than room temperature and which crystallizes at room temperature.

Crystalline epoxy resins include, for example, biphenol-type epoxy resins, bisphenol S-type epoxy resins, hydroquinone-type epoxy resins, dihydroxynaphthalene-type epoxy resins, etc. Based on the physical properties of cured resins from them, of the above preferred are biphenol-type epoxy resins of the following general formula:

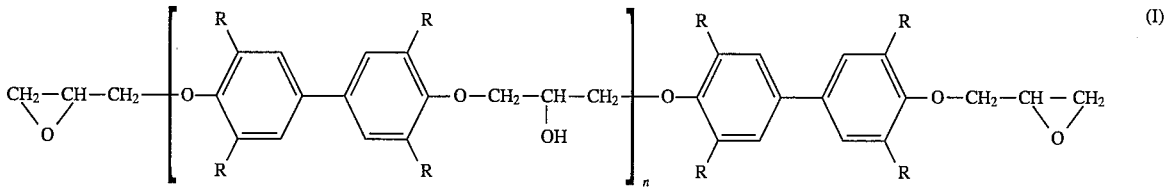

where R represents a hydrogen atom, an alkyl group having from 1 to 10 carbon atoms, a phenyl group or a halogen atom, and R's may be the same as or different from each other; and n represents a number from 0 to 2 as the mean value.

Compound (b) having two or more phenolic hydroxyl groups and/or carboxyl groups in one molecule, which is used in the present invention to modify epoxy resin (a) include, for example, various compounds having two or more phenolic hydroxyl groups in one molecule such as, for example, various phenols such as hydroquinone, catechol, resorcinol, dihydroxynaphthalene, bisphenol A, bisphenol F, bisphenol S, tetrabromobisphenol A, biphenol, tetramethylbiphenol, phenol-novolak resins, cresol-novolak resins, bisphenol A-novolak resins, dicyclopentadiene-phenol resins, terpene-phenol resins, naphthol-novolak resins, phenol-aralkyl resins, etc., as well as polyphenolic resins to be obtained by condensation of the various phenols mentioned above and various aldehydes such as hydroxybenzaldehyde, crotonaldehyde, glyoxal, etc.; various compounds having two or more carboxyl groups in one molecule such as, for example, phthalic acid, terephthalic acid, isophthalic acid, methylphthalic acid, trimellitic acid, pyromellitic acid, naphthalenedicarboxylic acid, hydrogenated compounds of these aromatic carboxylic acids, nadic acid, methylnadic acid, oxalic acid, malonic acid, succinic acid, glutaric acid, adipic acid, pimelic acid, suberic acid, azelaic acid, sebacic acid, maleic acid, fumaric acid, maleinated fatty acids, dimer acids, etc.; and various compounds having phenolic hydroxyl group(s) and carboxyl group(s) in one molecule such as, for example, hydroxybenzoic acid, dihydroxybenzoic acid, hydroxynaphthalene-carboxylic acids, etc. One or more of these compounds having two or more phenolic hydroxyl groups and/or carboxyl groups in one molecule can be used in the present invention.

The amount of the compound having two or more phenolic hydroxyl groups and/or carboxyl groups in one molecule to be used in the present invention is from about 3 to about 20 parts by weight to 100 parts by weight of epoxy resin component (a). If the amount of the compound used is too small, it is less effective in preventing the crystallization of resin (a) so that the liquid stability of the modified liquid epoxy resin composition is worsened. On the contrary, if the amount of the compound used is too large, the viscosity of the modified liquid epoxy resin composition increases, worsening the handleability of the composition.

Compound having one phenolic hydroxyl group or carboxyl group in one molecule (component c), which is used to modify epoxy resin (a) along with component (b), includes, for example, various monophenols such as phenol, cresol, xylenol, ethylphenol, propylphenyl, butylphenol, nonylphenol, phenylphenol, cumylphenol, chlorophenol, tribromophenol, naphthol, etc.; and various monocarboxylic acids such as formic acid, acetic acid, propionic acid, butyric acid, valeric acid, pivalic acid, lauric acid, stearic acid, acrylic acid, methacrylic acid, crotonic acid, benzoic acid, toluic acid, cinnamic acid, napthoic acid, etc. One or more of these compounds having one phenolic hydroxyl group or carboxyl group in one molecule can be used in the present invention.

The amount of the compound having one phenolic hydroxyl group or carboxyl group in one molecule to be used in the present invention is from about 3 to about 20 parts by weight to 100 parts by weight of epoxy resin (a). If the amount of the compound used is too small, it is less effective in preventing the crystallization of resin (a) so that the liquid stability of the modified liquid epoxy resin composition is worsened. On the contrary, if it is too large, the average number of the functional groups in the modified liquid epoxy resin composition or the number of the epoxy groups per molecule therein is decreased worsening the physical properties of cured resin of the composition.

The reaction of epoxy resin component (a), component (b) and component (c) of the present invention may be carried out in by conventional methods. For instance, the components are melted, mixed, and reacted for about 1 to about 10 hours at a temperature of from about 100° to about 200° C. in the presence of a catalyst to obtain the intended, modified liquid epoxy resin composition of the present invention.

As examples of the catalyst to be used in the reaction, mentioned are imidazoles such as 2-methylimidazole, 2-ethyl-4-methylimidazole, etc.; amines such as 2,4,6-tris-(dimethylaminomethyl) phenol, benzyldimethylamine, etc.; quaternary ammonium salts such as tetramethylammonium chloride, tetramethylammonium hydroxide, benzyltrimethylammonium bromide, etc.; phosphines such as tributylphosphine, triphenylphosphine, tris(dimethoxyphenyl)phosphine, etc.; phosphonium salts such as ethyltriphenylphosphonium iodide, ethyltriphenylphosphonium chloride, tetrabutylphosphonium bromide, etc.; alkali metal hydroxides such as sodium hydroxide, potassium hydroxide, etc.; and alkali metal salts such as sodium hydrogencarbonate, lithium chloride, etc. The catalyst is preferably present in the reaction mixture in an amount from about 50 to about 1000 ppm of the epoxy resin to be reacted.

The modification reaction may be conducted either by simultaneously reacting component (a) with both components (b) and (c) or by first reacting component (a) with component (b) or (c) followed by reacting the resulting reaction product with the remaining component.

The modification reaction may optionally use, as a reaction solvent an inert organic solvent such as, for example, alcohols such as ethanol, isopropanol, etc.; ketones such as acetone, methyl ethyl ketone, methyl isobutyl ketone, etc.; aromatic compounds such as benzene, toluene, xylene, etc.; ethers such as dioxane, ethyleneglycol dimethylether, etc.;

glycol ethers such as ethyleneglycol monomethylether, ethyleneglycol monoethylether, propyleneglycol monomethylether, etc.; and aprotonic polar solvents such as dimethylsulfoxide, dimethylformamide, etc.

Epoxy resin component (a) to be reacted by the modification reaction preferably comprises only a crystalline epoxy resin. However, it may in some cases contain, in addition to the crystalline epoxy resin, epoxy resins other than crystalline epoxy resins, whereupon all the epoxy resins may be modified at the same time. However, if the proportion of epoxy resins other than crystalline epoxy resins in component (a) is too large, cured resin of the composition containing component (a) cannot exhibit the excellent physical properties derived from crystalline epoxy resins. Therefore, it is desired that the proportion of the crystalline epoxy resin in component (a) is about 50 percent by weight or more of the total epoxy resin.

The modified liquid epoxy resin composition of the present invention has lost the crystallizing property due to the above-mentioned modification while maintaining the excellent cured properties of crystallizing epoxy resins, namely by yielding cured resin having good heat resistance and water resistance, and by exhibiting a low viscosity and good liquid stability at low temperatures. In order to further improve the liquid stability of the modified liquid epoxy resin composition or to further lower the viscosity of the same, the composition may be blended with any other epoxy resin.

Other epoxy resins with which the composition of the present invention may be blended include, for example, epoxy resins to be produced from various phenolic compounds such as, for example, various phenols such as bisphenol A, bisphenol F, bisphenol AD, resorcinol, methylresorcinol, dihydroxynaphthalene, phenol-novolak resins, cresol-novolak resins, bisphenol A-novolak resins, dicyclopentadiene-phenol resins, terpenephenol resins, phenol-aralkyl resins, naphthol-novolak resins and the like, as well as polyphenolic resins to be obtained by condensation of these various phenols and aldehydes such as hydroxybenzaldehyde, crotonaldehyde, glyoxal and the like, and epihalohydrins; epoxy resins to be produced from various amines such as diaminodiphenylmethane, aminophenol, xylenediamine and the like, and epihalohydrins; and epoxy resins to be produced from various carboxylic acid such as methylhexahydroxyphthalic acid, dimer acids and the like, and epihalohydrins.

Of these epoxy resins, preferred are liquid bisphenol-type epoxy resins to be produced from bisphenol A, bisphenol F, bisphenol AD and the like, in view of the physical properties of cured resin of the composition and of the low viscosity of the composition.

The proportion of the other epoxy resins which may be added to the composition of the present invention is preferably from about 20 to about 300 parts by weight to 100 parts by weight of the liquid epoxy resin composition as obtained by the modification of epoxy resin component (a). If the proportion of the other epoxy resins is too large, the added resins would detract from the excellent cured properties derived from the crystalline epoxy resin which yields cured resins having good physical properties.

The present invention also provides a curable liquid epoxy resin composition, which comprises the modified liquid epoxy resin composition of the invention and an epoxy resin curing agent.

The curing agent, which may be used in the present invention includes, for example, various phenolic resins such as, for example, various phenol resins such as phenol-novolak resins, cresol-novolak resins, bisphenol A-novolak resins, dicyclopentadiene-phenol resins, phenol-aralkyl resins, terpene-phenol resins and the like, as well as polyphenolic resins to be obtained by condensation of these various phenols and various aldehydes such as hydroxybenzaldehyde, crotonaldehyde, glyoxal, and the like; acid anhydrides such as methyltetrahydrophthalic anhydride, hexahydrophthalic anhydride, pyromellitic anhydride, methylnadic anhydride and the like; and amines such as diethylenetriamine, isophoronediamine, diaminodiphenylmethane, diaminodiphenylsulfone and the like.

The curable liquid epoxy resin composition of the present invention may contain various additives, like other conventional curable epoxy resin compositions. Such additives include, for example, a hardening accelerator, a filler, a coupling agent, a flame retardant, a plasticizer, a solvent, a reactive diluent retardant, a pigment, etc. These may be suitably added to the composition, if desired.

Suitable hardening accelerator may include, for example, imidazoles such as 2-methylimidazole, 2-ethyl-4-methylimidazole, etc.; amines such as 2,4,6-tris(dimethylaminomethyl)phenol, benzyldimethylamine, etc.; and organic phosphorous compounds such as tributylphosphine, triphenylphosphine, tris(dimethoxyphenyl)phosphine, etc.

Suitable filler includes, for example, silica, crystalline silica, glass powder, alumina, calcium carbonate, etc. Suitable flame retardant includes, for example, antimony trioxide, phosphoric acid, etc. By substituting a brominated epoxy resin for a part of the above-mentioned other epoxy resins in the composition, the composition may be made flame retardant.

The modified liquid epoxy resin composition and the curable liquid epoxy resin composition of the present invention yield cured resins having better heat resistance and water resistance than the conventional liquid epoxy resin compositions. In addition, the former have a low viscosity and good liquid stability as compared with the latter. Therefore, the compositions of the present invention are advantageous in their use as adhesives, casting materials, sealants, molding materials, laminating materials, etc.

EXAMPLES

Non-limiting examples and comparative examples of the modified liquid epoxy resin composition of the present invention as well as non-limiting examples and comparative examples of the curable liquid epoxy resin composition of the present invention are mentioned below, in order to further explain the invention in more detail.

Examples 1 to 6 and Comparative Examples 1 to 4 of Modified Liquid Epoxy Resin Composition:

An epoxy resin derived from tetramethylbiphenol (Epikote YX4000, trade name by Yuka Shell Epoxy Co.; having an epoxy equivalent of 186 and a melting point of 108° C.) or a mixture of an epoxy resin derived from tetramethylbiphenol and an epoxy resin derived from biphenol (Epikote YL6121, trade name by Yuka Shell Epoxy Co.; having an epoxy equivalent of 172 and a melting point of 128° C.), as crystalline epoxy resin (a); bisphenol A, bisphenol F, succinic acid or p-hydroxybenzoic acid, as compound (b) having two or more phenolic hydroxyl groups and/or carboxylic groups in one molecule; and nonylphenol or lauric acid, as compound (c) having one phenolic hydroxyl group or carboxyl group in one molecule were put in a 3000-ml three-neck flask equipped with a thermometer, a stirrer and a condenser tube, each in the amounts as indicated in Table 1 below, and these were heated up to 130° C. and dissolved uniformly. Next, 0.5 g of an aqueous 50 wt % tetramethylammonium chloride solution was added thereto. During this addition, the reactants were gradually heated up to 165° C. and kept at 165° C. for 3 hours so as to finish the reaction. For examples 1 and 5 and Comparative Examples 1 and 2, the reaction products themselves were modified liquid epoxy resin compositions. For Examples 2, 3, 4, and 6, a liquid epoxy resin derived from bisphenol F (Epikote 807, trade name by Yuka Shell Epoxy Co.; having an epoxy equivalent of 170) was added to and mixed with the reaction products, after the reaction, in the amount as indicated in Table 1, to give modified liquid epoxy resin compositions.

The epoxy equivalent, the viscosity at 50° C. and the liquid stability of each of these modified liquid epoxy resin compositions were measured and shown in Table 1. As Comparative Examples 3 and 4, the results of the analyses of a liquid epoxy resin derived from bisphenol A (Epikote 828, trade name by Yuka Shell Epoxy Co.) and a 1:1 mixture of the liquid epoxy resin derived from bisphenol A and the epoxy resin derived from tetramethylbiphenol, crystalline respectively, are also shown in Table 1.

Examples 7 to 12 and Comparative Examples 5 to 8 of Curable Liquid Epoxy Resin Composition:

Using each of the modified liquid epoxy resin compositions of Examples 1 to 6 and Comparative Examples 1 to 4 as the epoxy resin, methyltetrahydrophthalic anhydride as the hardener, and 2-methylimidazole as the hardening accelerator, the various hardening epoxy resin compositions indicated in Table 2 below were prepared. After each composition was defoamed, it was cast into a mold and hardened at 150° C. for 5 hours. The glass transition point and the water absorption of the cured resin were measured and shown in Table 2.

As is noted from the comparison between the examples and Comparative Example 1 in Table 1, the epoxy resin compositions obtained in the examples all had a low viscosity and good liquid stability, while the epoxy resin composition of Comparative Example 1 where component (c) had not been used had an extremely high viscosity and poor liquid stability. Although the epoxy resin composition of Comparative Example 2 where component (b) had not been used had a low viscosity, it had extremely poor liquid stability. The epoxy resin composition of Comparative Example 4 where the 1:1 mixture comprising the liquid epoxy resin derived from bisphenol A and the crystallizing epoxy resin derived from tetramethylbiphenol was used had a low viscosity but extremely poor liquid stability.

Also as is noted from Table 2, the cured resin of the examples all had a high glass transition point and low water absorption. However, the cured resins obtained in Comparative Example 1 where the liquid epoxy resin derived from bisphenol A was used had a low glass transition point and high water absorption.

TABLE 1

|  | Example 1 | Example 2 | Example 3 | Example 4 | Example 5 | Example 6 | Comp. Example 1 | Comp. Example 2 | Comp. Example 3 | Comp. Example 4 |
|---|---|---|---|---|---|---|---|---|---|---|
| Conditions for Modifying Epoxy Resin |  |  |  |  |  |  |  |  |  |  |
| (a) Crystalline epoxy resin | A | A | A | B | A | B | A | A | (I) | (J) |
| Amount used (g) | 1000 | 1000 | 1000 | 1000 | 1000 | 1000 | 1000 | 1000 |  |  |
| (b) Compound having two or more phenolic hydroxyl groups and/or carboxyl groups in one molecule | C | C | D | D | E | F | C | — |  |  |
| Amount used (g) | 50 | 70 | 100 | 100 | 40 | 70 | 150 | 0 |  |  |
| (c) Compound having one phenolic hydroxyl group and carboxyl group in one molecule | H | G | G | H | H | G | — | G |  |  |
| Amount use (g) | 100 | 50 | 50 | 100 | 80 | 70 | 0 | 100 |  |  |
| Amount of bisphenol F-derived liquid epoxy resin used (g) | 0 | 500 | 700 | 700 | 0 | 500 | 0 | 0 |  |  |
| Results of Analyses |  |  |  |  |  |  |  |  |  |  |
| Epoxy equivalent | 226 | 219 | 225 | 217 | 287 | 224 | 262 | 223 | 186 | 186 |
| Viscosity (ps) at 50° C. | 76 | 37 | 28 | 21 | 42 | 30 | 289 | 23 | 9 | 15 |
| Liquid stability (days)* | 7 | 8 | 9 | 9 | 8 | 8 | 4 | 2 | 8 | 1 |

Notes to Table 1:
A: An epoxy resin derived from tetramethylbiphenol (Epikote YX4000, trade name by Yuka Shell Epoxy Co.; having an epoxy equivalent of 186 and a melting point of 108° C).
B: Mixture of an epoxy resin derived from tetramethylbiphenol and an epoxy resin derived from biphenol (Epikote YL6121, trade name by Yuka Shell Epoxy Co.; having an epoxy equivalent of 172 and a melting point of 128° C).
C: Bisphenol A.
D: Bisphenol F.
E: Succinic acid.
F: P-hydroxybenzoic acid.
G: Nonylphenol.
H: Lauric acid.
I: A liquid epoxy resin derived from bisphenol A (Epikote 828, trade name by Yuka Shell Epoxy Co.).
J: Mixtures of a liquid epoxy resin derived from bisphenol A and a crystalline epoxy resin derived from tetramethylbiphenol mixed at a ratio of 1:1.
Liquid stability*: 20 g of a test sample of a liquid epoxy resin, 2 g of ethanol, 20 g of calcium carbonate powder were mixed and stored at 5° C., whereby the days before the liquid epoxy resin crystallized and lost its fluidity were counted.

TABLE 2

| | Example 7 | Example 8 | Example 9 | Example 10 | Example 11 | Example 12 | Comp. Example 5 | Comp. Example 6 | Comp. Example 7 | Comp. Example 8 |
|---|---|---|---|---|---|---|---|---|---|---|
| Composition | | | | | | | | | | |
| Modified liquid epoxy resin composition | Example 1 | Example 2 | Example 3 | Example 4 | Example 5 | Example 6 | Comp. Example 1 | Comp. Example 2 | Comp. Example 3 | Comp. Example 4 |
| Amount added (wt. pts.) | 100 | 100 | 100 | 100 | 100 | 100 | 100 | 100 | 100 | 100 |
| Amount of methyl-tetrahydrophthalic anhydride added (wt. pts.) | 66 | 68 | 66 | 69 | 57 | 66 | 52 | 66 | 80 | 80 |
| Amount of 2-methyl-imidazole added (wt. pts.) | 1 | 1 | 1 | 1 | 1 | 1 | 1 | 1 | 1 | 1 |
| Physical properties of hardened objects | | | | | | | | | | |
| Glass transition point (°C.) | 163 | 165 | 163 | 160 | 163 | 162 | 165 | 158 | 147 | 161 |
| Water absorption (%)* | 0.53 | 0.58 | 0.59 | 0.60 | 0.54 | 0.59 | 0.56 | 0.54 | 0.74 | 0.63 |

Water absorption*: The hardened sample was dipped in water of 100° C. for 100 hours, whereby the water absorption of the dipped sample was measured.

As can be seen from the Examples, the modified liquid epoxy resin composition and the curable liquid epoxy resin composition of the present invention have a low viscosity and good liquid stability at low temperatures, and these yield cured resins having excellent heat resistance and water resistance. The compositions are advantageous in their use as adhesives, casting materials, sealants, molding materials, laminating materials, etc.

We claim:

1. A curable liquid epoxy resin composition comprising (i) a liquid epoxy resin composition produced by reacting a reaction mixture comprising (a) 100 parts by weight of an epoxy resin comprising a crystalline epoxy resin, (b) from about 3 to about 20 parts by weight, based on the epoxy resin, of a compound having two or more phenolic hydroxyl groups, a carboxylic acid having two or more carboxyl groups, or a compound having phenolic hydroxyl group(s) and carboxyl group(s) in one molecule and (c) from about 3 to about 20 parts by weight, based on the epoxy resin, of a compound having one phenolic hydroxyl group or carboxyl group in one molecule and (ii) an epoxy resin curing agent.

2. The curable liquid epoxy resin composition of claim 1 wherein the crystalline epoxy resin is present in the epoxy resin component (a) in an amount of 50 percent by weight or more.

3. The curable liquid epoxy resin composition of claim 2 wherein the crystalline epoxy resin is a biphenol-type epoxy resin of a general formula:

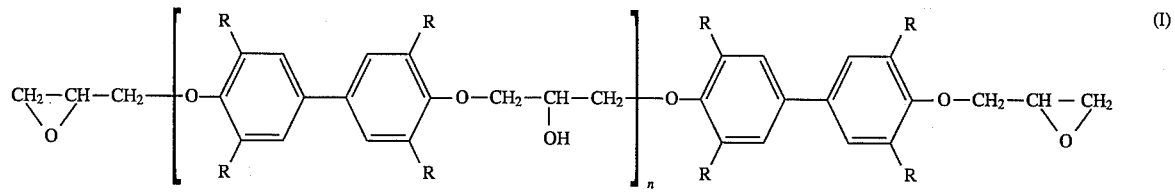

wherein R is independently a hydrogen atom, an alkyl group having from 1 to 10 carbon atoms, a phenyl group or a halogen atom; and n is a number from 0 to 2 as the mean value.

4. The curable liquid epoxy resin composition of claim 2 wherein the liquid epoxy resin composition further comprises from about 20 to bout 300 parts by weight, based on the liquid epoxy resin composition component (i), of a liquid bisphenol-type epoxy resin.

5. The curable liquid epoxy resin composition of claim 1 in which the epoxy resin component (a) consists of a crystalline epoxy resin.

6. The curable liquid epoxy resin composition of claim 1 wherein the curing agent component (ii) is selected from the group consisting of phenolic resins, acid anhydrides, and amines.

7. A cured resin composition of claim 1.

8. A cured resin composition of claim 3.

9. A cured resin composition of claim 4.

10. A cured resin composition of claim 5.

11. A cured resin composition of claim 6.

* * * * *